United States Patent [19]

Bayliss

[11] Patent Number: 5,435,638
[45] Date of Patent: Jul. 25, 1995

[54] SOLENOID-OPERATED FLUID-FLOW CONTROL VALVES

[75] Inventor: John P. Bayliss, Worcestershire, England

[73] Assignee: Lucas Industries Public Limited Company, United Kingdom

[21] Appl. No.: 68,687

[22] Filed: May 27, 1993

[30] Foreign Application Priority Data

Jun. 4, 1992 [GB] United Kingdom ............... 9211852

[51] Int. Cl.⁶ .............................................. B60T 8/42
[52] U.S. Cl. ...................... 303/119.2; 137/596.17; 251/129.01; 303/117.1; 303/15
[58] Field of Search ............... 303/119.2, 119.1, 117.1, 303/15, 68, 116.1, 116.2, 115.5, 115.4, 116.3, 118.1; 251/129.01, 129.22, 129.17, 129.16, 129.15, 129.09, 129.07, 30.01, 30.03; 137/596.16, 596.17

[56] References Cited

U.S. PATENT DOCUMENTS

| | | | |
|---|---|---|---|
| 3,820,856 | 6/1974 | Adahan | 303/117.1 |
| 4,619,289 | 10/1986 | Tsuru et al. | 303/119.2 |
| 4,778,227 | 10/1988 | Bayliss | 303/119.2 |
| 4,790,351 | 12/1988 | Kervagoret | 137/596.17 |
| 4,915,459 | 4/1990 | Hashida et al. | 303/117.1 |
| 5,002,344 | 3/1991 | Hashida | 303/117.1 |
| 5,026,123 | 6/1991 | Nokubo et al. | 303/117.1 |
| 5,186,093 | 2/1993 | Kervagoret | 303/119.2 |
| 5,221,129 | 6/1993 | Takasaki | 303/119.2 |
| 5,226,702 | 7/1993 | Brown et al. | 137/596.17 |
| 5,248,191 | 9/1993 | Kondo et al. | 303/119.2 |
| 5,261,731 | 11/1993 | Yogo et al. | 303/119.2 |

FOREIGN PATENT DOCUMENTS

| | | | |
|---|---|---|---|
| 0202845 | 11/1986 | European Pat. Off. | |
| 0251519 | 1/1988 | European Pat. Off. | |
| 0330391 | 8/1989 | European Pat. Off. | 303/119.2 |

*Primary Examiner*—Douglas C. Butler
*Attorney, Agent, or Firm*—Laff, Whitesel, Conte & Saret

[57] ABSTRACT

A solenoid-operated fluid-flow control valve comprises a housing (10) incorporating a solenoid coil (14), a single armature (15) responsive to energization of the coil to determine a pressure differential across a pressure-sensitive member (28, 18) and to open an exhaust port (45), in combination with a valve assembly (13) comprising a hollow valve body (16), and a valve head (19), the valve body being axially movable with respect to the housing in response to the pressure differential acting on the pressure-sensitive member. The valve body and the valve head are relatively movable axially with the valve head being movable with respect to a seating (47) in the housing and a seating (23) on the valve body, whereby to provide selective communication between an inlet port (46), an outlet port (47) and the exhaust port (45).

13 Claims, 3 Drawing Sheets

5,435,638

SOLENOID-OPERATED FLUID-FLOW CONTROL VALVES

This invention relates to improvements in solenoid-operated fluid-flow control valves. Particularly the invention is concerned with solenoid-operated flow control valves for use in hydraulic anti-skid braking systems for vehicles.

EP-A-0 202 845 discloses an anti-lock braking system for a vehicle in which a solenoid-operated flow control valve controls the behaviour of a braked wheel in response to signals from a wheel speed sensing means. The solenoid-operated flow control valve incorporates a metering spool which is moveable in a bore in a housing to control the release of fluid from the brake and the rate of re-application following wheel recovery by flow through orifices in the spool and defined between the spool and the bore.

The valve of EP-A-0 202 845 is expensive and complicated to produce due to machining operation which are required in order to maintain the necessary tolerances and to achieve suitable surface finishes.

It is known from EP-A-0 251 519 to replace the spool of a flow control valve with a solenoid-operated valve having a central bore and a central bore passage, and first and second armatures disposed at opposite ends of the central core. The first valve is provided at one end of the passage and comprises a valve member on the first armature adapted to cooperate with the first seating on the core, and a second valve is provided at or adjacent the opposite end of the core passage. Means defining a variable restrictor is operable in response to movement of the first valve member relative to the valve seating, and means defining a fixed fluid restrictor act in series with the variable restrictor.

According to our invention a solenoid-operated fluid-flow control valve incorporates a solenoid coil, a single armature responsive to energisation of the coil to determine a pressure differential across a pressure-sensitive member in a housing and to open an exhaust port, in combination with a valve assembly comprising a hollow valve body, and a valve head, the valve body being axially movable with respect to the housing in response to the pressure differential acting on the pressure-sensitive member, and the valve body and the valve head being relatively movable axially with the valve head being movable with respect to a seating in the housing and a seating on the valve body, whereby to provide selective communication between an inlet port, an outlet port, and the exhaust port.

In operation, energisation of the solenoid coil opens an exhaust valve to achieve, through the valve body, a pressure drop across the pressure-sensitive member and place the interior of the valve body in communication with the exhaust port, with the valve head engaging with the seating in the housing to isolate the inlet port from the outlet port, further movement of the valve body in the same direction moving the seating on the valve body away from the head in order to place the outlet port in communication with the exhaust port. Thus, when the flow-control valve is installed in a vehicle anti-lock hydraulic braking system, the inlet port is connected to a master cylinder, the outlet port is connected to the brake, and the exhaust port is connected to an expander chamber. Normally free communication will be provided between the inlet port and the outlet port, and the exhaust port will be closed by closure of the exhaust valve. In response to a skid signal the solenoid is energised to open the exhaust valve and upon initial movement of the valve assembly the master cylinder is isolated from the brake with the brake then being exhausted to the expander chamber. Upon brake re-application following correction of a skid, the solenoid is de-energised and a pump draws fluid from the expander chamber to pump it back into the master cylinder circuit with the brakes being re-applied at a rate determined by flow through a fixed orifice, and through a variable orifice.

The pressure-sensitive member may comprise a deflectable shim having an opening through it to define the fixed orifice, and the variable orifice is defined by co-operation between the shim and an opening in the end of the valve body remote from the armature.

In another construction the pressure-sensitive member comprises a non-deflectable plate which is axially displaceable, and a resilient member co-operating with the peripheral edge of the plate promotes a seal between the plate and the housing as well as providing compliance when a differential is applied across the plate to allow sufficient displacement for it to seal against the seating on the valve body.

Our fluid-flow control valve is simple and cheap to produce. No high precision machining is required. With the exception of housing, the majority of the components may be constructed of plastics material which, in turn, reduces the weight of given assembly.

Two embodiments of our invention are illustrated in the accompanying drawings in which.

Figure 1:
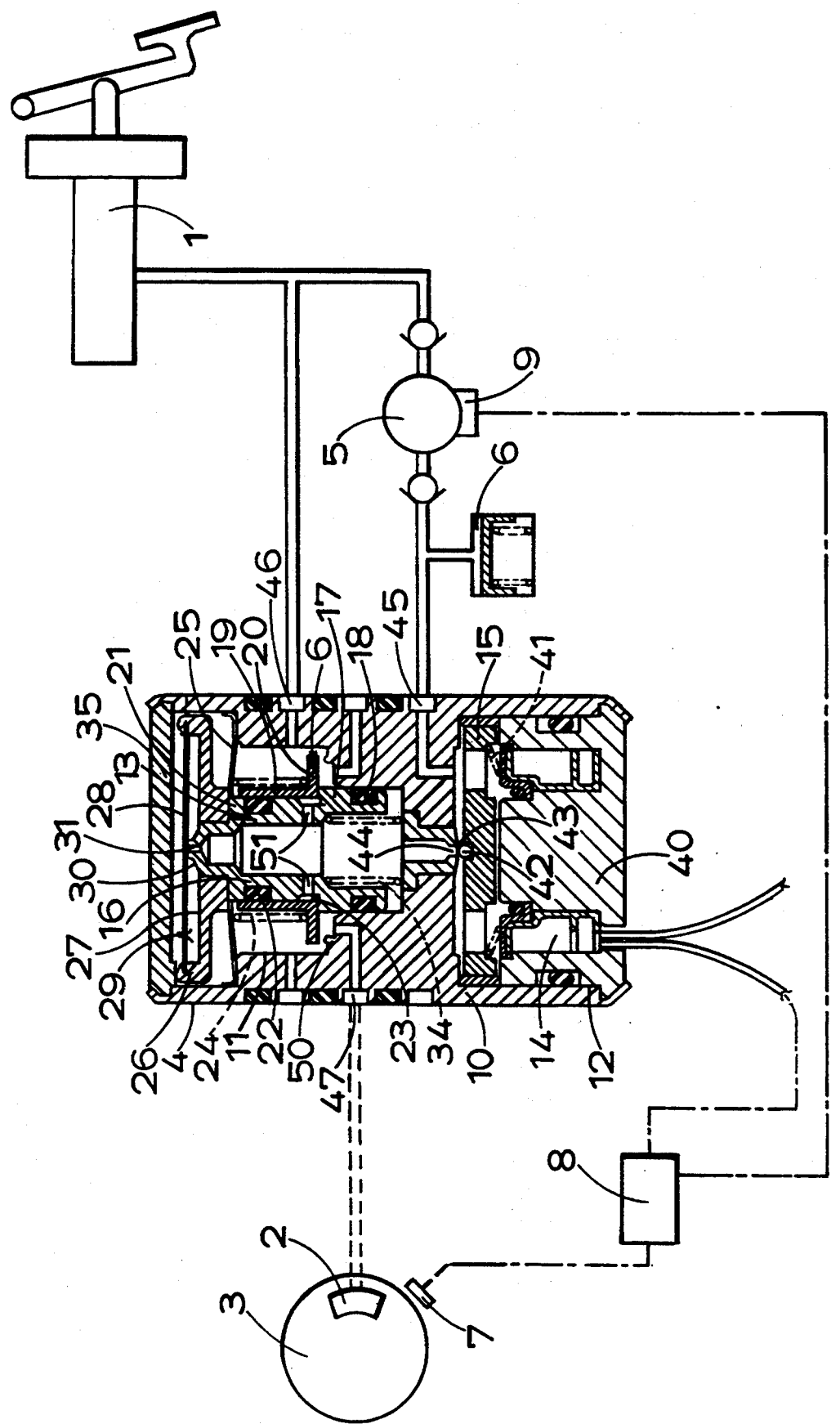
FIG. 1 is a layout of an anti-lock hydraulic braking system for a vehicle.

The anti-lock braking system illustrated in the layout of FIG. 1 comprises a pedal-operated master cylinder 1 for operating a brake 2 on a wheel 3 of a vehicle through a fluid-flow control valve 4. A pump 5 is adapted to withdraw hydraulic fluid from an expander chamber 6 and pump it into the master cylinder circuit in a manner to be described.

The speed of rotation of the wheel 3 is measured by a wheel speed sensor 7 and signals from the sensor 7 are received by an electronic control unit 8 which differentiates the signals and emits an energising current which is applied to the control valve 4 and to a motor 9 for driving the pump 5.

The fluid-flow control valve 4 comprises a housing 10 which is provided in opposite ends with bore portions 11 and 12. The bore portion 11 provides a housing for a valve assembly 13, and the bore portion 12 defines a housing for a solenoid coil 14, and an armature 15.

The valve assembly 13 comprises a valve body 16 which is hollow and of which a inner portion 17 of greater diameter carries a seal 18 sealingly received in an innermost portion of the bore 11 which is of smaller diameter. A valve head 19 of top-hat outline having a radial flange 20 is guided to slide on a part 21 of the valve body to which it is sealed by means of a seal 22. Normally the flange 20 is held against a seating 23 on the valve body by means of a helical spring 24 acting between the flange 20 and a flexible diaphragm 25 by means of which the valve body 16 is suspended from the wall of the bore portion 11. The valve body 16 is formed at the end remote from the armature 15 with the radial head 16 of large diameter of which an outwardly direction recess 27 accommodates a pressure-sensitive member 28 defined by a shim of which the peripheral edge is secured to the edge of the recess 27 and an orifice 29 of constant diameter interconnects opposite faces of the shim 28. The shim 28 is normally spaced from a seating 30 surrounding an opening 31 of small diameter in the adjacent end of the valve body 16. The shim 28 co-operates with the seating 30 to define an orifice of variable area.

A return spring 34 normally urges the valve 13 outwardly to abut against a closure member 35 which closes the outer end of the bore portion 11.

The solenoid coil 14 is located in an annular recess in the closure member 40 for the outer end of the bore portion 12. Normally the armature 15 is urged away from the solenoid 14 by means of a spring 41. In this position a valve head 42 carried by the armature engages with valve seating 43 surrounding an exhaust passage 44 in the housing and in communication with the interior of the valve body 16 to define an exhaust valve. The exhaust valve communicates with the expander chamber 6 through an exhaust port 45.

The master cylinder is connected to an inlet port 46 in the wall of the housing 10 and, in the normal inoperative position illustrated in the drawings, the inlet port 46 is connected to an outlet port 47. The outlet port 47, in turn is connected to the brake 2 through a space between the radial flange 20 and an annular seating 50 in the housing 10 and surrounding the inner end of the passage leading to the outlet 43. The interior of the valve body 16 is also filled with liquid through radial ports 51 in the valve body which communicate with the seating 23.

When signals from the sensor 7 are recognised by the control unit 8 as indicative of an incipient skid condition, the control unit 8 energises the solenoid 40. This draws the armature 15 towards it to open the exhaust valve, and the interior of the valve body 16 is placed in communication with the expander chamber 6 through the exhaust port 45. A pressure drop is developed across the shim 28 and the seal 18. This causes the valve assembly 30 to move relatively towards the armature 15 until the flange 20 seats against the seating 50 to isolate the inlet port 46 from the outlet port 47. Movement of the valve head 90 is therefore arrested by its engagement with the valve seating 50 and further movement of the valve body 16 in the same direction moves the seating 23 away from the flange 20 to open communication between the brake 2 and the expander chamber 6 through the radial passages 51 and the open exhaust valve.

The control unit 8 also energises the motor 9 and the pump 5 withdraws fluid from the expander chamber 6 and pumps it back into the master cylinder circuit and through the fixed orifice 29 and the variable orifice 30, 31. In this way circulation is matched to the output of the pump 5.

When the wheel recovers the control unit 8 de-energises the solenoid 14 which permits the exhaust valve to close. Fluid withdrawn from the expander chamber 6 by the pump 5 and pumped back into the master cylinder circuit is then utilised to re-apply the brake 2 at a rate determined by flow through the fixed orifice 29 and the variable orifice 30, 31.

When the pressure applied to the brake 2 is equal to the pressure developed by the master cylinder 1, the spring 34 moves the valve assembly 13 relatively away from the armature 15, in turn causing the flange 20 to move away from the seating 50 and re-connect the master cylinder 1 to the brake 2.

Figure 2:
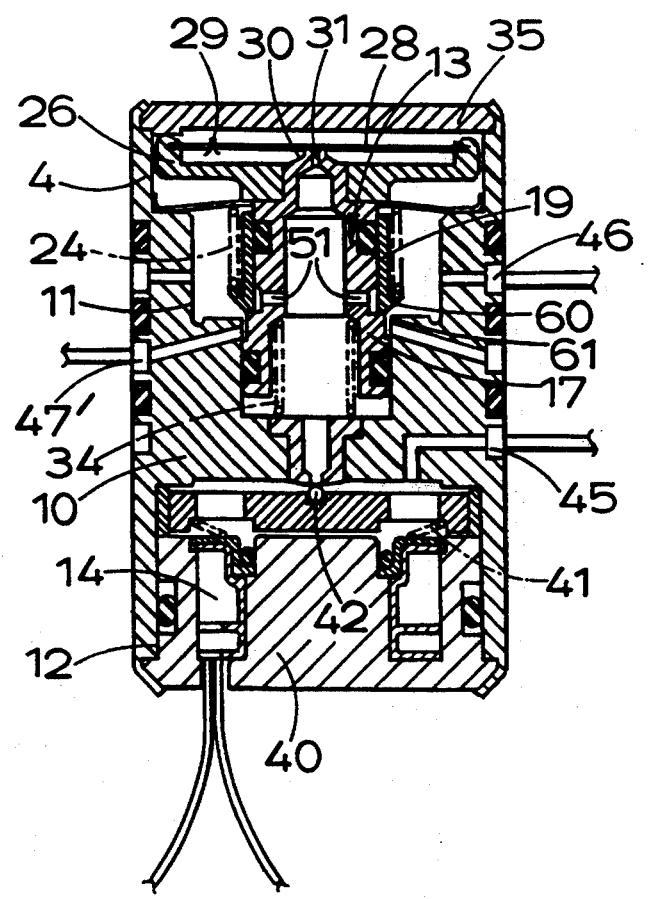
FIG. 2 is a section through a modified fluid-flow control valve for use in the braking system of FIG. 1.

In the fluid-control valve illustrated in FIG. 2 of the drawings the valve head 19 of top-hat section is replaced by a valve member formed at its inner end with a valve head 60 of conical outline, and the annular head with which it is engageable comprises a sharp edge 61 at a short step between the inner and intermediate diameter portions of the bore portion 11.

The construction and operation of this fluid-flow control valve of FIG. 2 is otherwise the same as that of FIG. 1 and corresponding reference numerals have been applied to corresponding parts.

Figure 3:
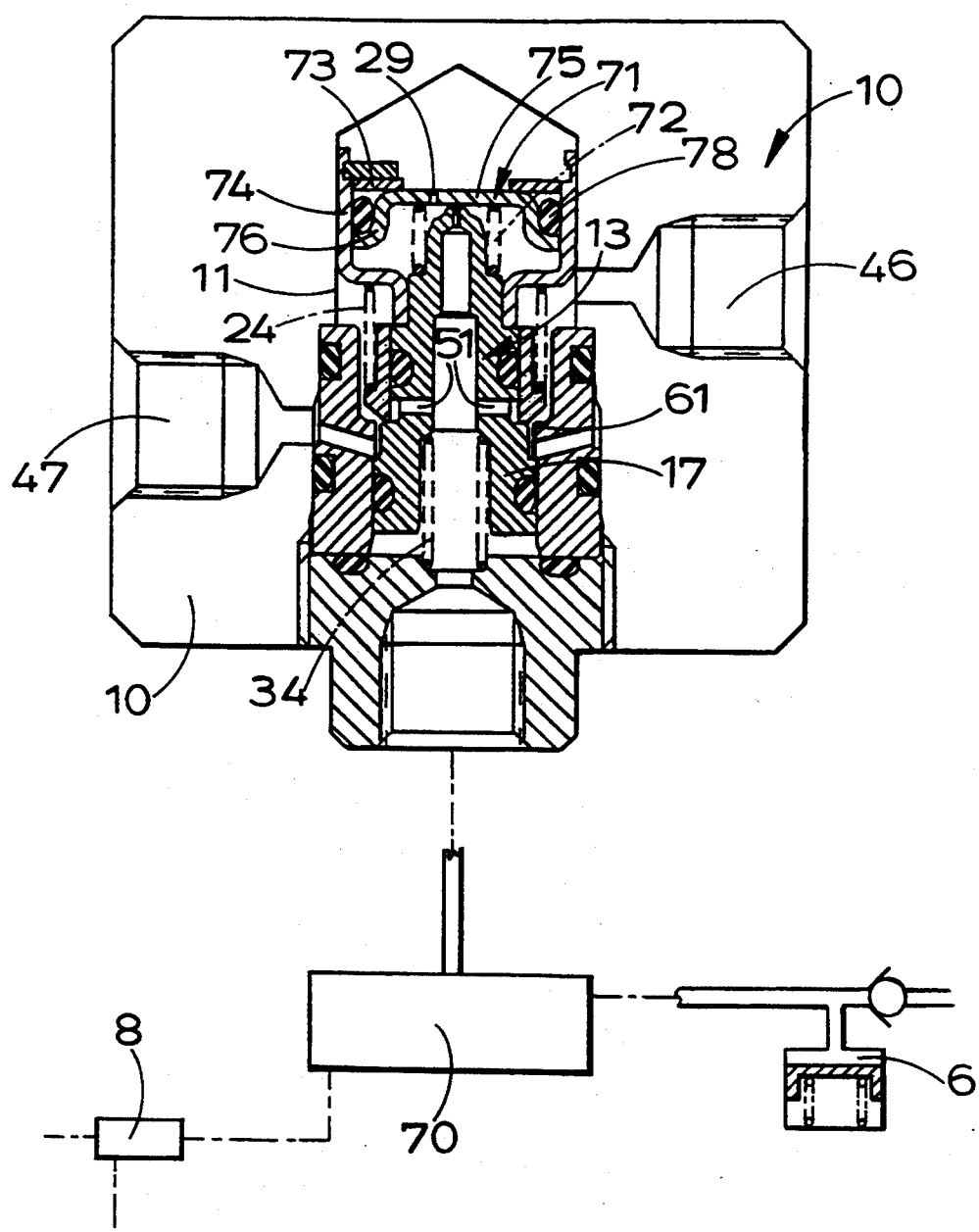
FIG. 3 is a section through another fluid flow-control valve for use in the braking system of FIG. 1.

In the fluid flow-control valve illustrated in FIG. 3 of the accompanying drawings the solenoid coil 14, the armature 15, the valve head 42 and the valve seating 43 are incorporated into a solenoid-valve 70 remote from the housing 10.

The flexible diaphragm 25 is omitted, and the shim 28 is replaced by a displacement diaphragm defined by a non-deflectable plate 71 provided with the orifice 29. A compression spring 72 surrounding the valve body 16 urges the plate 71 towards a radial shoulder 73 extending inwardly from a cage 74 which, in turn, is slidably mounted within the bore portion 11. The spring 24 abuts between the cage 74 and the valve head 19.

The plate 71 has a circular crown 75 in which the orifice 29 is located, and an edge region 76 which extends axially and radially to define an annular space 77 between the edge region 76 and the cage 74. An 'O' ring seal 78 of elastomeric material housed in the space 77 provided a seal between the cage 74 and the plate 75.

In operation a pressure drop across the plate 75 causes it to move bodily with respect to the cage 74 and the seating 30, to achieve an effect similar to that achieved by flexing of the diaphragm 25 in the embodiments of FIGS. 1 and 2. During such a movement the seal 78 provides compliance between the plate 75 and the cage 74 in addition to providing the seal therebetween, as described above.

The construction and operation of the flow-control valve of FIG. 3 is otherwise the same as that of FIG. 2 and corresponding reference numerals have been applied to corresponding parts.

I claim:

1. A solenoid-operated fluid-flow control valve comprising a solenoid coil, a single armature, a valve assembly, a seating, a housing having a bore and a pressure sensitive member working in said bore, an exhaust port downstream of said seating, said bore having an inlet port and an outlet port, and said armature being responsive to energisation of said coil to determine a pressure differential across said pressure-sensitive member and to open said exhaust port, in which said valve assembly further comprises a hollow valve body, and a valve head, said valve body having a seating, said valve body being axially movable with respect to said housing in said bore in response to said pressure differential acting on said pressure-sensitive member, and said valve body and said valve head being movable axially in said bore with said valve head being movable with respect to said bore seating and said valve body seating between a first, a second, and a third position, in which in said first position said inlet port and said outlet port are in communication with one another, and isolated from the exhaust port, said valve head abutting said valve body seating, in said second position following energization of said solenoid coil said valve head has moved within the bore to engage said bore seating to isolate said inlet port from said outlet port, and in said third position said valve body seating has moved away from said valve head to place said outlet port in communication with said exhaust port.

2. A control valve according to claim 1, in which said valve body has at one end a recessed head to accommodate said pressure sensitive member, said one end being remote from said armature.

3. A control valve according to claim 2, in which said pressure-sensitive member comprises a deflectable shim, an opening through said shim defining a fixed orifice, and a variable orifice defined by co-operation between said shim and an opening in one end of said valve body, said end being remote from said armature.

4. A control valve according to claim 2, in which said pressure-sensitive member comprises a non-deflectable plate which is axially displaceable, an opening through said plate defining a fixed orifice, and a variable orifice defined by co-operation between said plate and an opening in one end of said valve body, said end being remote from said armature.

5. A control valve according to claim 1, in which said pressure-sensitive member comprises a deflectable shim, an opening through said shim defining a fixed orifice, and a variable orifice defined by co-operation between said shim and an opening in one end of said valve body, said end being remote from said armature.

6. A control valve according to claim 1, in which said pressure-sensitive member comprises a non-deflectable plate which is axially displaceable, an opening through said plate defining a fixed orifice, and a variable orifice defined by co-operation between said plate and an opening in one end of said valve body, said end being remote from said armature.

7. A control valve according to claim 1, in which said valve body has at one end a recessed head to accommodate said pressure sensitive member, said one end being remote from said armature.

8. A solenoid-operated fluid-flow control valve comprising a solenoid coil, a single armature, a valve assembly, a seating, a housing having a bore and a pressure sensitive member working in said bore, an exhaust port downstream of said seating, said bore having an inlet port and an outlet port, and said armature being responsive to energisation of said coil to determine a pressure differential across said pressure-sensitive member and to open said exhaust port, in which said valve assembly further comprises a hollow valve body, and a valve head, said valve body having a seating, said valve body being axially movable with respect to said housing in said bore in response to said pressure differential acting on said pressure-sensitive member, and said valve body and said value head being movable axially in said bore with said valve head being movable with respect to said bore seating and said valve body seating, between a first, a second, and a third position, in which in said first position said inlet port and said outlet port are in communication with one another, and isolated from the exhaust port, said valve head abutting said valve body seating, in said second position following energization of said solenoid coil said valve head has moved within the bore to engage said bore seating to isolate said inlet port from said outlet port, and in said third position said valve body seating has moved away from said valve head to place said outlet port in communication with said exhaust port, wherein said pressure sensitive member comprises a plate adapted to co-operate with said valve body, said plate having an opening defining a orifice of fixed area, and said valve body is formed at one end for co-operation with said plate with an opening defining a variable orifice by said co-operation between said valve body and said plate, and wherein a first spring acts to bias said valve body away from said plate, and a second spring acts to bias said valve head towards said valve body seating.

9. A solenoid-operated fluid-flow control valve as claimed in claim 8, wherein a cage housed within said bore includes a radial shoulder, said first spring urges said plate towards said radial shoulder, and said second spring abuts between said cage and said valve head.

10. A solenoid-operated fluid-flow control valve as claimed in claim 9; wherein said plate has a circular crown in which the orifice is located, and an edge region which extends axially and radially to define an annular space between the edge region and said cage, an annular seal being housed in said space to provide a seal between said cage and said plate.

11. A solenoid-operated fluid-flow control valve as claimed in claim 8, wherein said valve assembly and said pressure sensitive member both work in said bore in said housing and said bore includes said exhaust part and said seating, and said housing has a second bore in which works said armature.

12. A solenoid-operated fluid-flow control valve as claimed in claim 8, including a solenoid valve remote from said housing, wherein said solenoid coil, said armature, said valve head, and said valve seating are incorporated into said solenoid valve.

13. A solenoid-operated fluid-flow control valve comprising a solenoid coil, a single armature working in a first bore in a housing, a valve assembly working in a second bore in said housing, said second bore having a seating, and a pressure sensitive member working in said second bore, said first bore having an exhaust port, said second bore having an inlet port and an outlet port, and said armature being responsive to energisation of said coil to determine a pressure differential across said pressure-sensitive member and to open said exhaust port, in which said valve assembly further comprises a hollow valve body, and a valve head, said valve body having a seating, said valve body being axially movable with respect to said housing in said second bore in response to said pressure differential acting on said pressure-sensitive member, and said valve body and said valve head being movable axially in said second bore with said valve head being movable with respect to said second bore seating and said valve body seating, between a first, a second, and a third position, in which in said first position said inlet port and said outlet port are in communication with one another, and isolated from the exhaust port, said valve head abutting said valve body seating, in said second position following energization of said solenoid coil said valve head has moved within the second bore to engage said second bore seating to isolate said inlet port from said outlet port, and in said third position said valve body seating has moved away from said valve head to place said outlet port in communication with said exhaust port.

* * * * *